United States Patent [19]

Deets et al.

[11] 4,097,552
[45] Jun. 27, 1978

[54] NITROGENOUS POLYMER COMPOSITIONS

[75] Inventors: Gary L. Deets, Springfield; Peter Shapras, Wilbraham, both of Mass.

[73] Assignee: Monsanto Company, St. Louis, Mo.

[21] Appl. No.: 807,870

[22] Filed: Jun. 20, 1977

[51] Int. Cl.$^2$ ............................ C08K 3/06; C08K 3/22
[52] U.S. Cl. ................... 260/876 R; 260/45.7 R; 260/45.7 SE; 260/880 R; 526/41; 526/47.8; 526/914; 528/481
[58] Field of Search .................. 260/45.7 R, 45.7 SE, 260/42.24, 876 R, 880 R; 526/3

[56] References Cited

U.S. PATENT DOCUMENTS

| | | |
|---|---|---|
| 3,542,701 | 11/1970 | Van Raamsdonk ........... 260/45.7 SE |
| 3,862,070 | 1/1975 | Fukushima et al. ............ 260/45.7 R |
| 3,876,568 | 4/1975 | Wysocki ....................... 260/45.7 SE |
| 3,912,792 | 10/1975 | Touval ........................... 260/45.7 SE |
| 3,947,431 | 3/1976 | Gomez ............................ 260/876 R |
| 3,954,908 | 5/1976 | Nakamura et al. ............. 260/876 R |
| 4,017,559 | 4/1977 | Deets et al. ...................... 260/876 R |

*Primary Examiner*—Donald E. Czaja
*Assistant Examiner*—R. A. White
*Attorney, Agent, or Firm*—W. J. Farrington; J. C. Logomasini; S. M. Tarter

[57] ABSTRACT

Polymer compositions comprising a nitrogenous polymer, especially an acrylonitrile-containing polymer, evolve reduced amounts of hydrogen cyanide on combustion when containing an alkaline earth metal oxide and sulfur.

6 Claims, No Drawings

NITROGENOUS POLYMER COMPOSITIONS

BACKGROUND OF THE INVENTION

This invention relates to a method for reducing the amount of noxious gas evolved during the combustion of a nitrogenous polymer.

It is known that when nitrogenous polymers are burned the combustion products are often found to comprise hydrogen cyanide. In view of the known toxicity of this gas, it is desirable that the amount of any such gas released when these polymers burn be minimized.

It would also be advantageous if, when a polymer composition is made flame-retardant by the incorporation therein of a halogen-containing material, the emission of hydrogen chloride during decomposition of the polymer at high temperatures could be controlled.

It has now been discovered that the amount of noxious gas evolved during high temperature decomposition of nitrogenous polymers can be controlled by the use of a blend of certain additives.

SUMMARY OF THE INVENTION

The present invention provides a polymer composition comprising a nitrogenous polymer and from 2.5 to 20 percent by weight of an alkaline earth metal oxide and from 2.5 to 20 percent by weight of sulfur, all percentages being based on the weight of the nitrogenous polymer.

This nitrogenous polymer is understood to be a polymer containing nitrogen such as for example polyamides, polyimides, melamine/formaldehyde, urea/formaldehyde, polyurethanes and acrylonitrile polymers (including copolymers). It is found that the additive combination is particularly suitable for use with polymers containing nitrile monomers such as styrene/ acrylonitrile polymers and acrylonitrile/butadiene/styrene including variations such as substitution of methacrylonitrile for acrylonitrile, chloroprene for butadiene and chlorostyrene for styrene.

The alkaline earth metal oxide component may be added in the form of effectively equivalent compounds which under polymer decomposition conditions yield this oxide, such as barium, calcium and magnesium carbonates or the corresponding hydroxides. All such are intended to be embraced within the term "alkaline earth metal oxide". Of the compounds in this general class, calcium oxide is most preferred. This component is also effective in reducing any hydrogen halide content of the emissions.

The sulfur is in the form of elemental sulfur or a compound which under conditions of polymer decomposition, yields elemental sulfur.

The amount of sulfur used can be from 2.5 to 20 percent by weight based on the polymer weight but is generally between 5 and 15 percent. About 8 to 12 percent by weight gives very good results. Likewise, the amount of the alkaline earth metal oxide employed falls in the range 2.5 to 20 percent by weight based on the polymer weight with from 5 to 15 percent and especially from about 8 to 12 percent by weight, being preferred. Usually equal amounts of the alkaline earth metal oxide and sulfur give satisfactory results.

The polymer composition may additionally comprise additives such as antioxidants, stabilizers of various sorts, fillers, and flame retardants. It is however found that the use of a large amount of halogen-containing flame retardant results in a reduced efficiency from the point of view of HCN emission reduction, possibly because one or both components are used up in reacting with the hydrogen halide. It is therefore advisable when the polymer compositions of the invention comprise a halogen-containing flame retardant, that the quantities of additives be adjusted to give a balance of the desired properties.

DESCRIPTION OF THE PREFERRED EMBODIMENTS

The examples which follow demonstrate the effectiveness of the compositions of the invention. the imprrtant measurements of gas evolved on burning are made using an NBS smoke test chamber. This is a closed chamber adapted to permit two kinds of combustion, smouldering and flaming, indicated as SC and FC respectively. Gases evolved are sampled and analyzed. The actual measurement of the amount of HCN evolved is not considered to be a part of this invention. In this regard, any method capable of detecting amounts of HCN as low as one part per million can be used to measure the amount of evolved HCN. These methods, which are well known to those skilled in the art, include colorimetric measurements, gas chromatographic measurements and electrochemical measurements. The results obtained are expressed in parts per million by volume per 10 grams burned (ppmv/10 g).

The NBS Smoke Test Chamber is fully described in ASTM Special Technical Publication 422, page 174.

EXAMPLES 1-7

These Examples demonstrate the effectiveness under both flaming and smouldering conditions of two compositions of the invention and demonstrate the synergistic effect obtained using the combination by comparison over either component alone.

In the case of Examples 1 and 2 and comparative Examples C1 to C4, the base polymer is an ABS formed by blending a styrene/acrylonitrile polymer with a butadiene polymer grafted with styrene and acrylonitrile. The polymer composition comprises 30 percent by weight of acrylonitrile which is present either in the form of superstrate grafted onto the polybutadiene rubber or in the matrix polymer.

For Examples 3 to 7 and comparative Examples C5 to C8, the base polymer is a copolymer of styrene and acrylonitrile polymerized in the presence of a polychloroprene rubber. The polymer composition comprises 30 percent by weight of acrylonitrile which is present either in the form of superstrate grafted onto the polychloroprene rubber or in the matrix polymer.

The results obtained in all the above Examples are set forth in Table 1 below.

TABLE I

| Ex. | Additive | Wt. % of Additive(s) | Combustion Conditions | ppmv/10g. HCN | Reduction % in HCN |
| --- | --- | --- | --- | --- | --- |
| C1 | None | — | FC | 119 | — |
| C2 | None | — | SC | 131 | — |
| C3 | Sulfur | 5 | FC | 82 | 32 |
| C4 | Sulfur | 5 | SC | 118 | 10 |

TABLE I-continued

| Ex. | Additive | Wt. % of Additive(s) | Combustion Conditions | ppmv/10g. HCN | Reduction % in HCN |
|---|---|---|---|---|---|
| C5 | None | — | FC | 200 | — |
| C6 | None | — | SC | 200 | — |
| C7 | Calcium Oxide | 10 | FC | 130 | 35 |
| C8 | Sulfur | 5 | FC | 210 | (−5) |
| 1 | Magnesium Carbonate & Sulfur | 5/5 | FC | 68 | 43 |
| 2 | Magnesium Carbonate & Sulfur | 5/5 | SC | 79 | 40 |
| 3 | Sulfur & Calcium Carbonate | 5/5 | FC | 180 | 10 |
| 4 | Sulfur & Calcium Oxide | 5/10 | FC | 120 | 40 |
| 5 | Sulfur & Calcium Oxide | 5/10 | SC | 110 | 45 |
| 6 | Sulfur & Calcium Oxide | 10/10 | FC | 120 | 40 |
| 7 | Sulfur & Calcium Oxide | 10/10 | SC | 80 | 60 |

The results show that the compositions of the invention perform substantially better than those in which one (or both) of the sulfur or alkaline earth metal oxide additives is missing.

The polymers of the present invention are useful for preparing a wide variety of molded objects such as radio and television cabinets, appliance housings, parts and components for vehicles, furniture and other related items.

Polymers of the present may be further modified with conventional additives and adjuvants such as fillers, plasticizers, U.V. stabilizers, heat stabilizers, antioxidants, etc. Care should be taken when formulating or compounding the polymers of the present invention so as not to affect adversely the toxic gas-suppressing properties of the compositions of the present invention.

It is anticipated that many minor modifications and variations could be made in the invention described herein without changing the essential elements thereof and it is understood that all such modifications and variations are embraced within the purview of this invention.

What is claimed is:

1. A polymer composition comprising a nitrogenous polymer and from 2.5 to 20 percent by weight of an alkaline earth metal oxide and from 2.5 to 20 percent by weight of sulfur, all percentages being based on the polymer weight.

2. The polymer composition of claim 1 in which the nitrogenous polymer is a copolymer containing from 10 to 90 percent of acrylonitrile.

3. The polymer composition of claim 2 in which the polymer comprises a styrene/acrylonitrile copolymer and a diene rubber substrate with styrene and acrylonitrile grafted thereon.

4. The polymer composition of claim 1 which comprises from 5 to 15 percent by weight each of calcium oxide and sulfur based on the polymer weight.

5. The polymer composition of claim 1 in which the amounts of alkaline earth metal oxide and sulfur are substantially equal.

6. A polymer composition comprising a copolymer of styrene and acrylonitrile and from 8 to 12 percent by weight based on the copolymer weight of each of calcium oxide and sulfur.

* * * * *